(12) United States Patent
Orndorff, Jr.

(10) Patent No.: US 7,490,992 B2
(45) Date of Patent: Feb. 17, 2009

(54) INTEGRAL BEARING UNIT MADE FROM A SLIPPERY/POLYMER ALLOY

(75) Inventor: Roy Lee Orndorff, Jr., Kent, OH (US)

(73) Assignee: Duramax Marine, LLC, Hiram, OH (US)

( * ) Notice: Subject to any disclaimer, the term of this patent is extended or adjusted under 35 U.S.C. 154(b) by 0 days.

(21) Appl. No.: 11/982,497

(22) Filed: Nov. 2, 2007

(65) Prior Publication Data

US 2008/0063327 A1 Mar. 13, 2008

Related U.S. Application Data

(63) Continuation of application No. 11/118,049, filed on Apr. 29, 2005, now Pat. No. 7,290,932, which is a continuation of application No. 10/437,216, filed on May 13, 2003, now Pat. No. 6,921,206, which is a continuation of application No. 09/849,802, filed on May 4, 2001, now Pat. No. 6,626,573, which is a continuation of application No. 08/834,352, filed on Apr. 16, 1997, now abandoned.

(60) Provisional application No. 60/015,571, filed on Apr. 18, 1996.

(51) Int. Cl.
*F16C 17/14* (2006.01)
(52) U.S. Cl. ............................................. 384/98
(58) Field of Classification Search ............... 384/98, 384/97, 115, 292, 291, 293
See application file for complete search history.

(56) References Cited

U.S. PATENT DOCUMENTS

| 1,299,799 | A | 4/1919 | Smalley |
| 1,376,043 | A | 4/1921 | Sherwood |
| 1,416,988 | A | 5/1922 | Sherwood |
| 1,510,804 | A | 10/1924 | Sherwood |
| 3,743,306 | A | 7/1973 | Kramer |

(Continued)

OTHER PUBLICATIONS

*Friction, Wear, Lubrication, a Textbook in Tribology*, Ludema, Kenneth C., CRC Press.
*New Extended Life Water Lubricated Bearings, Using a High Performance Polymer Alloy*, Orndorff, Jr., Roy L. and Sheppert, Richard V.

(Continued)

*Primary Examiner*—Thomas R Hannon
(74) *Attorney, Agent, or Firm*—D. Peter Hochberg; Sean F. Mellino; Daniel J. Smola

(57) ABSTRACT

A bearing unit for holding a shaft, the bearing unit having a housing and integral lands extending inwardly from the inner surface of the housing for tangentially engaging the rotating shaft, the bearing unit being made from a slippery polymer alloy comprising a heterogeneous composition of a thermoplastic in a continuous phase, a thermoplastic rubber compound dispersed in the thermoplastic and a lubricant dispersed in the thermoplastic.

10 Claims, 8 Drawing Sheets

U.S. PATENT DOCUMENTS

| | | |
|---|---|---|
| 3,971,606 A | 7/1976 | Nakano et al. |
| 4,568,056 A | 2/1986 | Lewinski |
| 4,626,112 A | 12/1986 | Kramer |
| 4,735,982 A * | 4/1988 | Orndorff, Jr. ............... 524/269 |
| 4,737,688 A | 4/1988 | Collins et al. |
| 5,518,318 A | 5/1996 | Orndorff, Jr. |
| 6,626,573 B2 | 9/2003 | Orndorff, Jr. |

OTHER PUBLICATIONS

*Naval Engineers Journal*, "Water-Lubricated Rubber Bearings, History and New Developments," Orndorff, Jr., Roy L., Nov. 1985.

*The Royal Institution of Naval Architects*, "Warship '96 International Symposium on Naval Submarines 5 'The Total Weapon System,'" London, Jun. 12-14, 1996.

* cited by examiner

INTEGRAL BEARING UNIT MADE FROM A SLIPPERY/POLYMER ALLOY

CROSS REFERENCE TO RELATED APPLICATIONS

This application is a continuation of application Ser. No. 11/118,049 filed Apr. 29, 2005, which is a continuation of application Ser. No. 10/437,216, filed on May 13, 2003 (now U.S. Pat. No. 6,921,206), which is a continuation of application Ser. No. 09/849,802, filed May 4, 2001 (now U.S. Pat. No. 6,626,573), which was a continuation of application Ser. No. 08/834,352, filed Apr. 16, 1997 (now abandoned), which claimed priority to provisional application Ser. No. 60/015,571, filed Apr. 18, 1996.

BACKGROUND OF THE INVENTION

1. Field of the Invention

This invention relates to a bearing unit and more particularly to a new and novel bearing unit for use in supporting a water-lubricated propeller shaft as in large naval ships.

2. Description of the Prior Art

Bearing assembly with elastomeric bearing elements are particularly suited for this purpose because of their excellent ability to withstand the effects of corrosive fluids and to abrasion resulting from particulars of foreign matter carried in suspension in the sea water in which the shaft and bearing assembly operates. Such bearing assembly with their elastomeric bearing elements have been made and are still being made with outer non-corrosive support or shell-with a plurality of circumferentially evenly spaced elastomeric staves therein.

The science of lubricated bearings commenced in the 1880's with the discovery of considerable fluid pressure in the oil-film of bearings, from which oil-lubricated bearings were developed. In the 1890's tilting-pad oil-lubricated metal bearings were invented and later tilting-pad journal bearings were developed. In lilting-pad bearings, the pads physically move (rather than deflect) because of the very high modules or stiffness of the metal, to give the right approach angles required to develop very low hydrodynamic (self pumping) lubrication.

The term "elastohydrodynamic" evolved to cover those dynamic cases (like gear teeth) where the bearing surfaces were rapidly moving in and out of contact yet were apparently hydrodynamically lubricated, if only for periodic, very short time intervals. It was later theorized that the low friction of certain oil-lubricated plastic bearings was due to a fluid-trapping pocket being formed in the plastic.

Early water-lubricated rubber bearings were not very effective because the bearings did not develop hydrodynamic lubrication. Water-lubricated bearings in the 1960's were in the category of medium wear devices, the same category as automotive brake linings. This was because the rubber was too thick, the surface was too rough and the side edges were rounded.

Thin rubber bearings have different wear and friction action from harder nonmetallic materials used in bearings. When a radial load is initially applied to a thin rubber bearing, the deflection is elastic and disappears if the load is removed. After a short period of time under load, the deformation becomes permanent and remains after load removal because of the compression set present in every rubber compound. This action is called Plasto-Elastohydrodynamic lubrication. This type of favorable lubrication action is enhanced by the special elastic-creep properties of some rubber compounds. It was found that thin nitrile rubber bearings for rotating shafts or journals partially immersed in water developed a continuous, unbroken film of water resulting from hydrodynamic lubrication. Tests of rotating journals on thin rubber bearings formed a plastic-elastohydrodynamic pocket in the rubber. It was determined that the pressure developed by the hydrodynamic pumping process deformed the rubber, pushing it out towards the sides and ends of the bearing contact patch forming a non-contact region or pocket in the center of the contact patch rubber, i.e. plasto-elastohydrodynamic ("PEH") lubrication. It was further found that bearing sample patches made of polymeric plastic materials harder than rubber initially deflected less than samples made of thin rubber, but eventually developed deep grooves and wore away after partially completing the 28-day test procedure.

There have been developed brass backed rubber staves since the 1920's, and plastic backed rubber staves since 1976. The prior art further includes rubber in compression impinging on slippery surfaces such as Teflon, ultra high molecular weight, polyethylene (UHMWPE) and other materials. See U.S. Pat. Nos. 3,743,306, 4,568,056, 4,626,112 and 4,737,688.

SUMMARY OF THE INVENTION

An object of the invention is to provide an improved bearing unit for a rotating shaft.

Another object is to provide an improved bearing element for a bearing unit for use with a rotating shaft.

Still a further object is to provide an improved bearing unit using lubricated trapping pockets for reducing the friction for a shaft rotating in the assembly.

It is an additional object to provide a non-metallic bearing stave for supporting or assisting in the support of a shaft rotating in water or other fluid, such as a propeller shaft for a ship or boat.

Yet still a further object is the provision of an improved bearing stave for use in a low-friction, low-wear bearing.

Another object is to provide a bearing unit for the rotating shaft of a ship or boat, the assembly having one or more staves with reduced stave length-to-shaft diameter ratios over prior bearing units with staves.

Another object is to provide a bearing unit for rotating shafts having three staves which have improved performance over prior three staved bearing units.

Yet an additional object is to provide a staved bearing unit for rotating shafts of ships or boats having a reduced number of components from prior staved bearing units for ships or boats.

Another object is to provide an improved bearing element for a bearing unit for rotating shafts, having lower breakaway friction than prior bearing elements.

Yet another object is the provision of an improved bearing element for a bearing unit for rotating shafts, having lower low-speed friction than prior bearing elements.

Another provision is an improved bearing element for a bearing unit for rotating shafts having zero drum wear.

It is another object of the invention to provide an improved bearing element for a shafted bearing unit capable of operating for a longer system wear life than did prior such bearing elements under higher contact pressure.

A further object is to provide a method for making a bearing unit with staves having discontinuous surfaces for supporting rotating shafts, the staves made from slippery polymer alloy ("SPA").

A further object is to provide a method for making a bearing stave made from SPA.

A general object is to provide a bearing stave and a bearing unit for rotating shafts which is of improved performance and efficiency from the prior art, and which can be produced using currently available economic materials.

The present invention is directed to a novel bearing unit utilizing an outer shell and a plurality of circumferentially-spaced bearing elements in contact with the shaft, the bearing elements having transverse grooves or a hydrodynamic pattern provided therein to thereby reduce the bearing friction torque and the wear, thus enhancing the performance of the bearing.

The present invention further includes a bearing unit with one or more elements such as staves for supporting the rotating shaft of a ship or boat, where the staves have discontinuous surfaces such as lands formed by a series of transverse grooves extending across the width of the staves at protuberances or contact points distributed over the stave surfaces, and are made from SPA.

The discontinuous surfaces of the bearing elements provide multiple contacts on the rotating shaft, and develop individual conforming water-lubricated polymer alloy miniature bearings. During operation, water lubricant pockets develop as a result of the PEH effect, to essentially lift the rotating shaft from the bearing element(s) to reduce the friction and wear of the bearing elements. The invention is particularly useful for high pressure (load), on the order of from 250 to 3000 k Pa. (35 psi to 435 psi). The length-to-diameter (L/D) ratio is reduced, and has been found to enable successful L/D ratios of from 2.0 all the way down to 0.85 or lower, rather than the conventional L/D ratio value of from 4 to 7.

An unexpected aspect to the present invention is that whereas one would have expected the friction to increase as the contact area of the rotating shaft by the bearing elements decreased (pressure increased), in fact just the opposite happened. As the contact area of the bearing decreased with increased load by virtue of the discontinuous surfaces of the bearing, the friction and wear significantly decreased. The discovery of this phenomenon is an essential aspect of the present invention.

DETAILED DESCRIPTION

Figure 1:
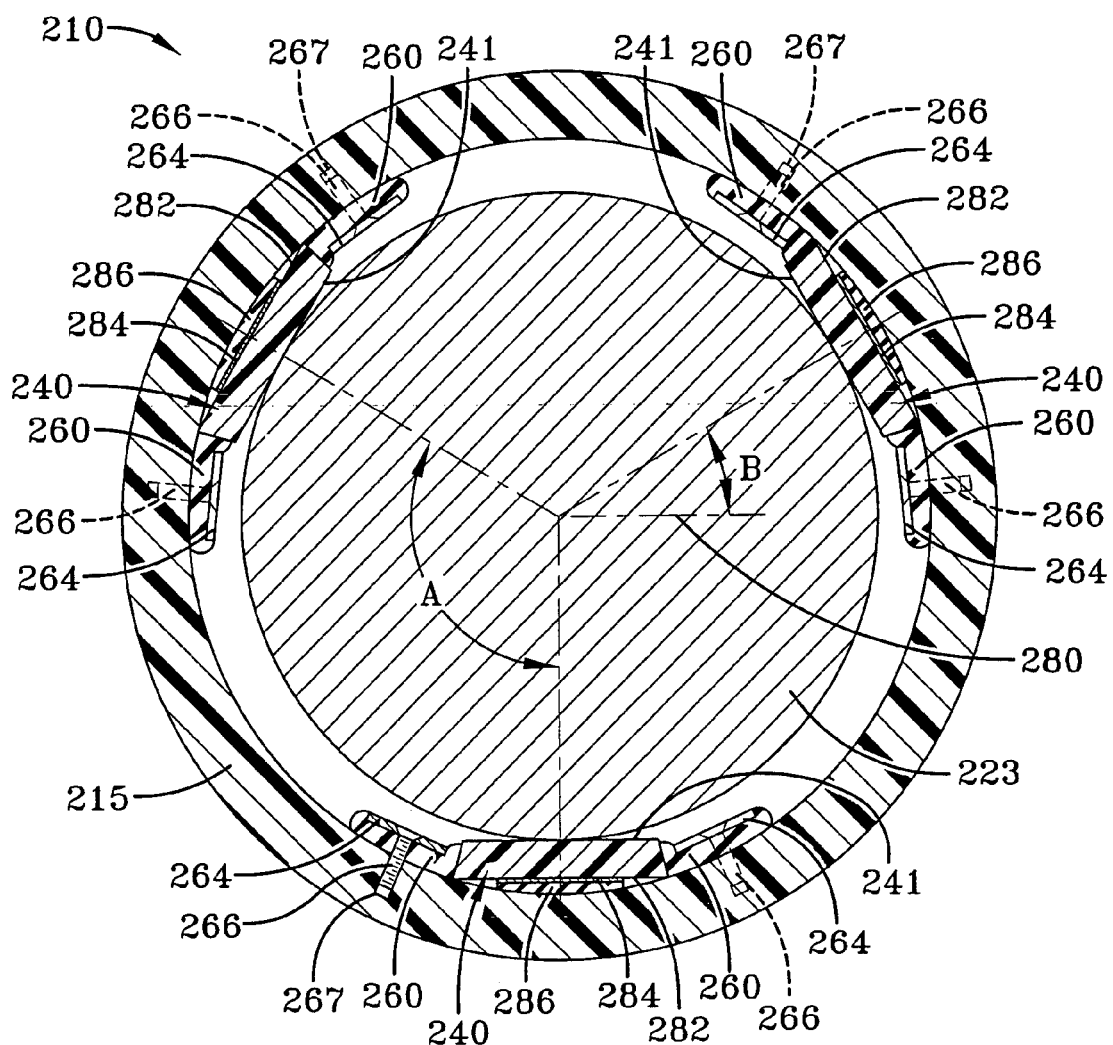
FIG. 1 is a cross sectional view of a bearing unit in accordance with the present invention.

Referring now to FIG. 1, wherein a bearing unit 210 in accordance with the present invention includes a housing 215 having three staves 240 provided around the radial inner portion thereof. Each stave 240 is held in place by a pair of elastomeric members 260. A rigid plate or bar 264 is disposed on top of each elastomeric member 260. A screw or bolt 266 extends through a clearance shaft (not shown) in each bar 264 and elastomeric member 260 and engages with threaded hole 267 in housing 215. Tightening screw 266 pulls rigid plate 264 towards housing 215, thereby compressing and deforming each elastomeric member 260 causing them to expand sideways and put compression on each stave 240 and hold them in place.

Each stave 240 has a grooved bearing surface 241, a substantially flat backside 282 and is supported by one or more shims or pads 284, 286. Preferably, each stave 240 backside 282 is in contact with a top shim 284 comprised of a hard material, (such as metal, composite material or other hard plastic), which is supported by a bottom pad 286 comprised of a resilient or compressible material, (such as soft plastic, rubber or other elastomer). Flat backed staves are more economical to produce compared with round backed staves. Lower stave 240 supports drive shaft 223, and the two upper staves 240 tangentially engage the drive shaft 223 in cooperative action with the lower stave 240 to prevent extraneous movement of the shaft 223.

Housing 215 is preferably made from a metallic structure such as brass, a plastic shell or a composite non-metallic structure. Housing 215 is most preferably comprised of fiberglass-reinforced epoxy, with a glass content on the order of 70% by weight.

Staves 240 are preferably made from an elastomeric/plastic composite, such as that described in commonly owned U.S. Pat. No. 3,993,371 or a homogenous slippery polymer alloy (SPA) such as is disclosed in U.S. Pat. Nos. 4,725,151 and 4,735,982, all of which are hereby fully incorporated herein by reference. SPA is an alloy or mixture of a thermoplastic and an already-cross-linked thermoset rubber compound, along with a smaller amount of lubricant. SPA is a heterogeneous composition wherein the thermoplastic exists in a continuous phase and the thermoset is dispersed therein as a discontinuous phase. In other words a thermoplastic matrix is formed, having the thermoset compound and the lubricant dispersed therein, as opposed to an admixture.

The thermoplastic compound can be any polymer which exhibits tough, low friction and good wear resistant properties. A specific group of such polymers are the various ultra high molecular weight polyethylenes (UHMWPE) which are known to the art as well as to the literature. Ultra high molecular weight polyethylenes are generally classified as those having a weight average molecular weight of greater that 2.5 million, that is from about 3.0 million to about 7.0 million using the solution viscosity method. A desired range is from about 4 million to about 6.5 million with a preferred range being from about 5 million to about 6 million. Such polyethylenes are commercially available from Hoechst Celanese Corporation under the name GUR 413.

At present, there are no plastics other than UHMWPE potentially suitable for use in the present invention having low friction properties such as a breakaway coefficient of static friction at 0 rpm of 0.25 or less, desirably 0.20 or less and preferably 0.15 or less. The desired thermoplastic material of the present invention also has a toughness as measured by an Izod unnotched impact test (ASTM D256) of 20 foot-pounds/inch or greater and preferably of 30 or greater. However, unnotched test samples did not fail. The thermoplastic material of the present invention also has good wear resistance as measured by a sand slurry abrasion test. The sand slurry abrasion test is a test of Hoechst Celanese Corporation wherein generally a test specimen (1"×3"×¼") is rotated at 1200 RPM over a 24-hour period in a slurry containing 2 parts of water and 3 parts sand.

An effective amount of the ultra high molecular polyethylene is utilized such that it forms a continuous phase in the SPA. Generally, the amount of a thermoplastic compound is sufficient to coat the thermoset rubber compound which generally exist in the form of particles and more desirably an amount in excess of that required to coat the rubber particles. Based upon the total weight of the SPA, the amount of the thermoplastic often utilized is from about 25% to about 90% by weight, desirably from about 40% to about 75% by weight and preferably from about 55% to about 65% by weight.

The thermoset compound is a cured rubber compound which typically has low friction as well as good oil and water resistant properties. By "low friction" it is meant that rubber bearings of a desired thickness range, when water lubricated, develop hydrodynamic lubrication at normal journal (shaft) operating speeds. Thin rubber bearings develop hydrodynamic friction at lower shaft speeds than any other known bearing material due to the Plasto-Elastohydrodynamic effect. Hydrodynamic lubrication is the developing of a fluid film between the bearing and a rotating shaft. "Plasto-elasto" refers to the favorable enhancement of the hydrodynamic action means of plastic (creep and set) and elastic deformation. By the terms "oil and water resistant," it is meant that the elastomer is unaffected (not dissolved or softened) and the volume increase caused by swell in water is under 5%, and preferably under 3%.

Generally any rubber compound having such friction and water resistant properties can be utilized. A specific group of such compounds are various nitrile rubbers which are known to the art and to the literature. For example, the various Hycar nitrile rubber compounds manufactured by BFGoodrich Company and its licensees can be utilized.

The various harder nitrile rubber compounds are generally preferred. A specific example of such a rubber is compound H-201 (85+/−5 Shore A hardness) manufactured by the BF Goodrich Company. Another example is a softer nitrile rubber such as compound H-203, also manufactured by the BF Goodrich Company which has a Shore A hardness of-about 65±5. Other rubbers include Butyl rubber, EPDM, that is rubber made from ethylene-propylene-diene monomers, and fluorelastomers based on the copolymer of vinylidene fluoride and hexafluoropropylene thought to have the following repeating structure —CF—CH—CF—CF(CF)—. Such copolymers are sold under the trademark "Viton" by DuPont. Although these other rubber compounds can be utilized, the nitrile rubbers are highly preferred.

It is an important aspect of the present invention that the cured (cross-linked) rubber compound can be initially dry blended or mixed with the thermoplastic compound before the alloy is formed.

Accordingly, the rubber compound is pre-cured and in order to mix the two components, it is ground to a suitable size. Conventional grinding methods can be utilized such as mechanical or cryogenic grinding. Particle size of the cured rubber compound is generally important. The particle size is generally measured as being finer, that is being able to pass through, a specific Tyler mesh screen. The cured rubber compounds thus generally have a particle size smaller than 35 mesh, desirably smaller than 65 mesh, and preferably smaller than 100 mesh. The amount of the cured rubber in the SPA is generally from about 10% to about 70% by weight, desirably from about 12% to about 40% by weight and preferably from about 15% to about 30% by weight based upon the total weight of the SPA.

The lubricant is generally added in the form of a solid and hence is non-liquid. In order to ensure a good dispersal thereof, the lubricant typically is in the form of a powder. By the term powder, it is meant that a majority, and at least 70%, 80% or 90% and more desirably at least 95% of the particles are smaller than a Tyler 100 mesh screen, that is 150 microns. Desirably, a majority of the powder, typically 80%, 90%, or even 95% is smaller than 200 mesh, that is 75 microns. Preferably a majority of the graphite powder, that is 70%, 80% or 90%, is smaller that 325 meshes, that is 44 microns. Any lubricant known to the art as well as to the literature can be utilized which imparts lubricating properties to the SPA. By lubricating properties it is meant that the coefficient of friction of the dry surface of the formed SPA is reduced, as for example, on the order of at least 10% and more desirably at least 20% or 30% when wear starts. The lubricant also should be nonabrasive. Graphite constitutes a preferred lubricant. An example of a specific graphite is grade 117-A, manufactured by Asbury Graphite Mills, Inc. Another specific lubricant is molybdenum disulfide. Although not generally preferred, molybdenum disulfide is desirable in dry end-use applications where moisture is not available, even as atmospheric moisture vapor. Silicone oils can also be utilized in an amount of from about 2% to about 10% by weight and desirably from about 3% to about 6% by weight based upon the total weight of the SPA. Examples of specific silicone oils include 200 Fluid manufactured by Dow Corning.

The amount of the lubricant generally is from about 0.5% or 3% by weight to about 25% by weight, desirably from about 1.0% to about 20% by weight, and preferably from about 2% to about 10% weight based upon the total weight of the SPA.

To this end, it has been discovered that certain material factors for staves 240 are important. First, hydrophobic materials are preferred. Second, the elastomer hardness should be about 80 Shore A. Third, the ratio of journal diameter of the shaft to the top width of the stave should be about 4 to 7. Fourth, the elastomer thickness should be about 0.125 inch to 0.312 inch in the case of rubber-faced staves. Fifth, the surface finish of the stave should be under 10 micro inches. Sixth, unique harder polymer alloy bearing contact material, such as the SPA material described previously provides preferable wear and friction characteristics.

Elastomeric members 260 are preferably comprised of natural or nitrile rubber compounds and are preferably 0.75 to 1.5 inches wide before compression. Rigid plates 264 are preferably comprised of a metal, such as stainless steel, or a hard plastic, such as fiber-reinforced epoxy. The compressed elastomeric members 260 expand to grip the sides of the staves 240. They also distort around the ends of the staves to provide an axial locking feature.

Bottom pads 286 offer alignment capability. Top shim 284 is utilized to control the operating clearance between the bearing bore and the shaft 223 to eliminate or minimize shaft movement and to simplify the bearing renewal and replacement process. Each stave in a stave type bearing functions as an individual and independent bearing surface. The deflection capability of bearing 210 provides for a zero clearance bearing (ZCB). ZCB's are most stable because, among other things, the unloaded staves can be depressed by the rotating shaft 223 as it develops hydrodynamically pressurized lift-off pressure on the load carrying staves. Furthermore, gritty water stave wear in a ZCB will be greatly reduced because the reverse flow particle rejection process is most efficient when the shaft (journal) is in close contact with all of the staves (no unloaded clearance space). In a ZCB there is zero clearance between all of the staves and the shaft at zero shaft speed and no radial load. In a conventional stave bearing designed with initial clearance, the side or top staves are unloaded with the shaft not touching them. The efficiency of the reverse flow particle rejection process is reduced with increasing clearance, thereby causing wear of surfaces of the side or top staves. The grit particles pass through the clearance space instead of being rejected back, thereby flowing out through the water grooves.

The three staves are preferably located approximately 120° apart (angle A), with the two upper staves located approximately 30° (angle B) above horizontal line 280 and the lower stave located approximately 90° below horizontal 280.

Figure 2:
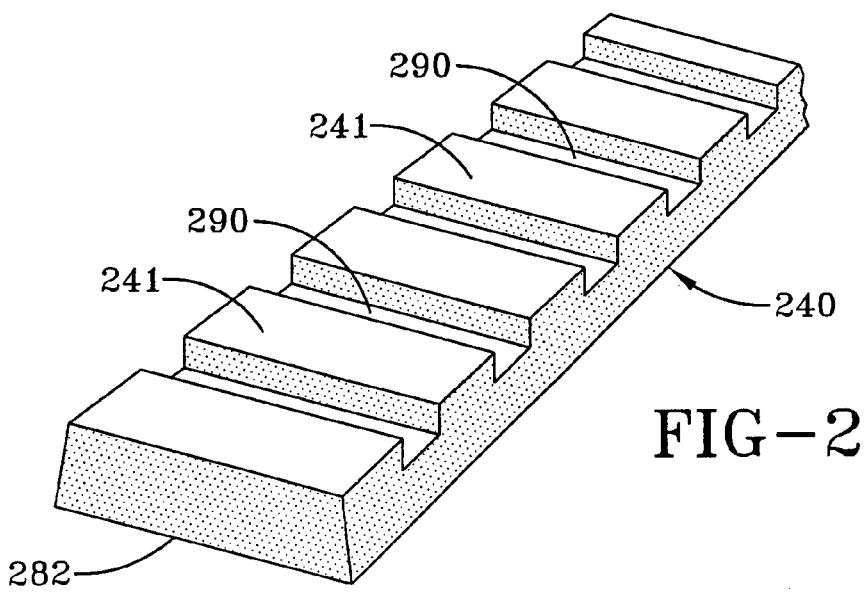
FIG. 2 is an isometric view of a bearing stave in accordance with the present invention.

Referring now to FIG. 2, wherein a stave 240 for the bearing 210 of FIG. 1 is illustrated. Staves 240 have a plurality of transverse grooves 290 provided therein and distributed along the axial length of the stave thereby leaving a plurality of lugs or protrusions 241 protruding towards the axial centerline. The grooves may be either molded into the material or machined into the material, with machining the preferred method. The particular dimensions for the staves will differ for each application. For a stave on the order of 0.75 inches thick, the grooves 290 are preferably on the order of 0.25 inches deep and 0.33 inches wide, with a separation between grooves of on the order of 1 inch. Machining grooves in the staves increases the amount of contact pressure in between the grooves. The stave dimensions and groove dimensions must be picked such that the applied load is high enough for low friction and wear to occur, but the bulge ratio must be also low enough for the staves to adjust and form a lubricant trapping pocket.

Figure 3A:
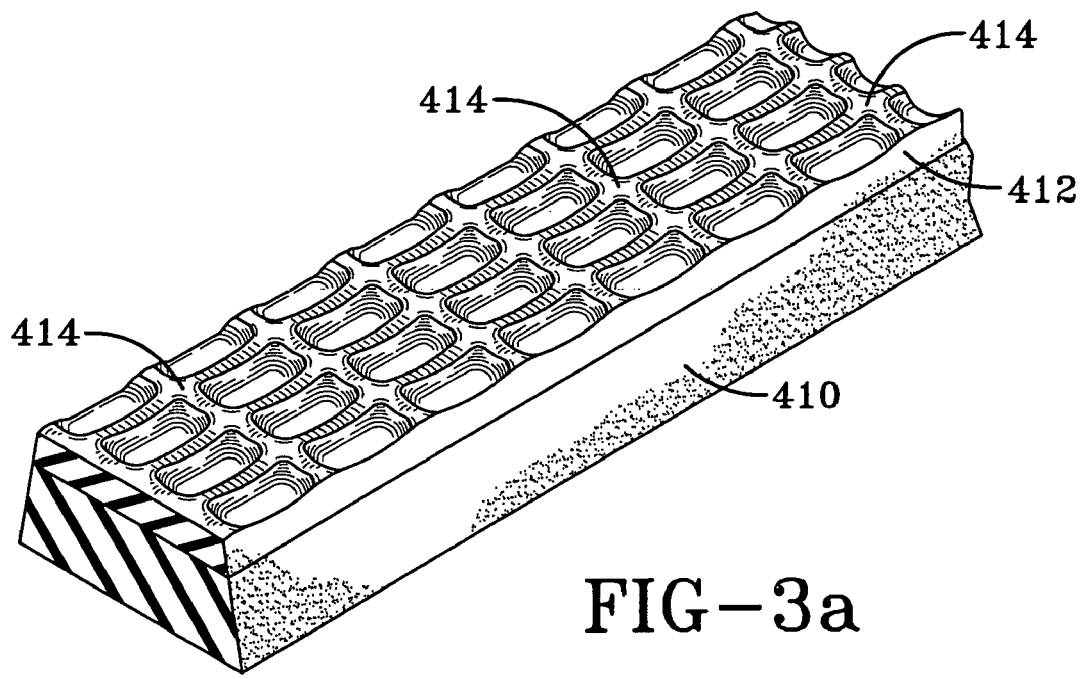
FIGS. 3a-3b are isometric view of alternate embodiments for bearing material for use in a bearing unit in accordance with the present invention.
Figure 3B:
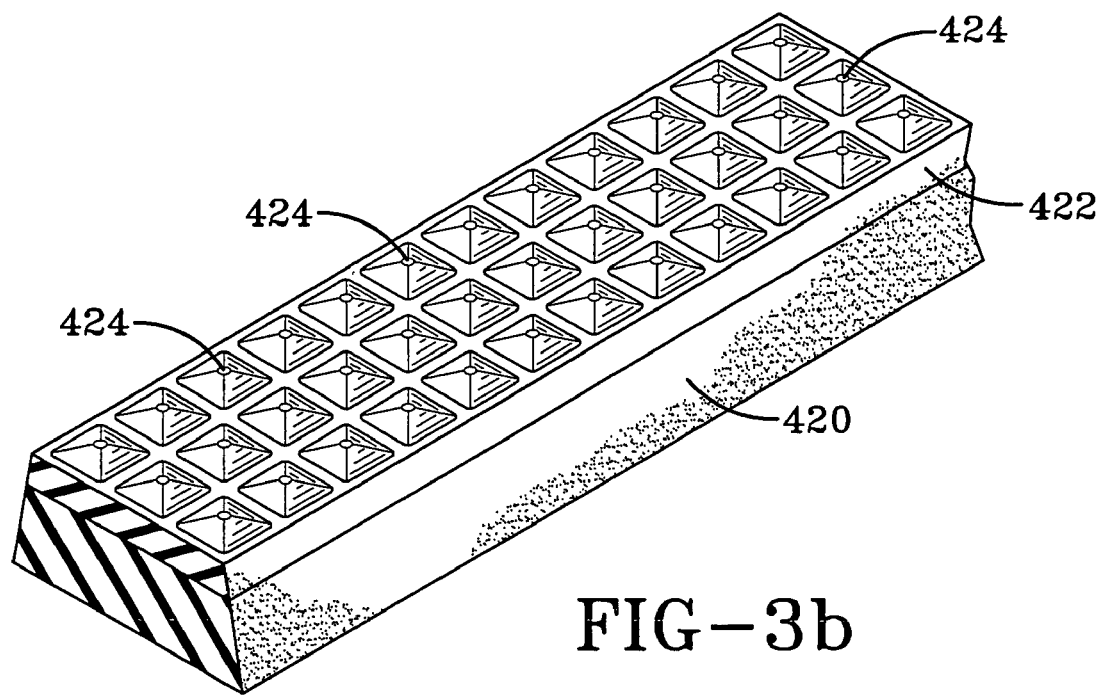

Referring now to FIG. 3a-3b, wherein alternate embodiments for staves 240 are illustrated. The bearing material is molded in large flexible slabs. The material is molded and shaped against a plate or rough fabric to provide a surface with many protuberances or contact points, 414, 424 wherein the protuberances can each individually become hydrodynamic bearing surfaces when fluid lubricated. The material is molded, and shaped against a rough fabric (FIG. 3a) or plate with many protuberances. The molded staves consist of an elastomeric/plastic composite, such as that described in commonly owned U.S. Pat. No. 3,993,371 or most preferably a homogeneous slippery polymer alloy (SPA) such as is disclosed in U.S. Pat. Nos. 4,725,151 and 4,735,982, all of which are hereby fully incorporated herein by reference. The SPA bearing material layer is preferably on the order of 0.125 inches thick. It is then adhered during slab cure to a nitrile rubber backing sheet. The rubber backing makes the slab flexible, and when abraded, is easy to bond to a metal or composite bearing outer shell using room temperature curing epoxy adhesives or contact cement when making a round bore bearing. The rubber backing is rapidly and easily sanded or ground by means of a machine to give the correct overall thickness for the particular bearing size. The adhesive layer adds around 0.005/0.010 inch to the bearing total wall thickness. There is therefore no need to grind or machine the bearing surface. Grinding the bearing surface increases friction and wear.

It is to be noted that the staves in FIGS. 3a-3b may be made completely from the aforementioned SPA material. That is, the staves 240 may not have a bottom layer 410 and therefore would be comprised of a single layer comprised of the material for a bearing material or top layer 412.

Referring now to FIG. 3a, an alternate stave material 240 may be manufactured by providing a patterned bottom layer 410 of elastomer in a mold, wherein the bearing material is molded in large flexible slabs. The nitrile is catalog number H-201 available from the BFGoodrich Company. Next, top layer 412 of slippery polymer alloy (SPA) is provided on the elastomer. A thermoplastic and a thermoset rubber compound, along with a smaller amount of a lubricant form the SPA. The SPA is a heterogeneous composition wherein the thermoplastic exits in a continuous phase and the thermoset is dispersed therein as a discontinuous phase. In other words a thermoplastic matrix is formed, having the thermoset compound and the lubricant dispersed therein, as opposed to an admixture.

Next, a pattern is transferred into the top layer of the bearing surface of the bearing material. The preferred method of transferring this pattern is to place a polyester sheet between a piece of heavy, loose knit or loose weave fabric which presses the polyester sheet and fabric into the surface of the SPA bearing material before melting and molding takes place. The fabric is preferably catalog no. 8708 available from Georgia Duck. The polyester release sheet is preferably 0.003 inch thick Mylar. The polyester sheet smoothes out the resultant SPA layer and rounds the edges so the protuberances, lands, or contact points 414 can each individually become hydrodynamic bearing surfaces when fluid lubricated. It is to be noted that prior to pressing the polyester and fabric into the material, the fabric should be sprayed with a mold release, such as catalog no. RTC 9110, manufactured by Chem-Trend, in a manner well known in the art to ensure the fabric can be removed after molding. After the fabric and polyester sheet have been placed against the bearing section it should be pressed in, such as by closing the mold. The material is then molded for approximately 0.5-2.0 hrs. under pressure of approximately 1000 to 1500 psi at approximately 350° F. After this molding process, the temperature of the mold is allowed to return to ambient while the pressure is maintained. The mold should be allowed to cool down for approximately 1 hr. after molding. It has been found that cooling the composite under pressure helps to prevent warping of the final article. Application of water to the outside of the mold may also be utilized to reduce the mold cooling time to 1 hour to prevent warping and cracking of the finished product.

Referring now to FIG. 3b, an alternate bearing material may be manufactured in accordance with the procedure for the composite illustrated in FIG. 3a, thereby yielding a composite having bottom layer 420 of elastomer and a top layer 422 of SPA having diamond shaped protuberances or contact points 424 provided therein. The protuberances 424 protrude axially outward and can each individually become hydrodynamic bearing surfaces when fluid lubricated. The diamond shaped pattern in the top layer 422, however, is provided by utilizing a rubber mold having the appropriate impression or pattern provided therein. A polyester sheet, such as Mylar, may be placed between the rubber mold and the SPA before molding. The polyester sheet is preferably on the order of 0.003 inches thick. The polyester sheet smoothes out the resultant SPA layer and rounds the corners of the protuberances.

It is to be noted that other shape and size patterns not specifically disclosed herein maybe provided in the top alloy layer in order for the bearing to be hydrodynamic.

Figure 4:
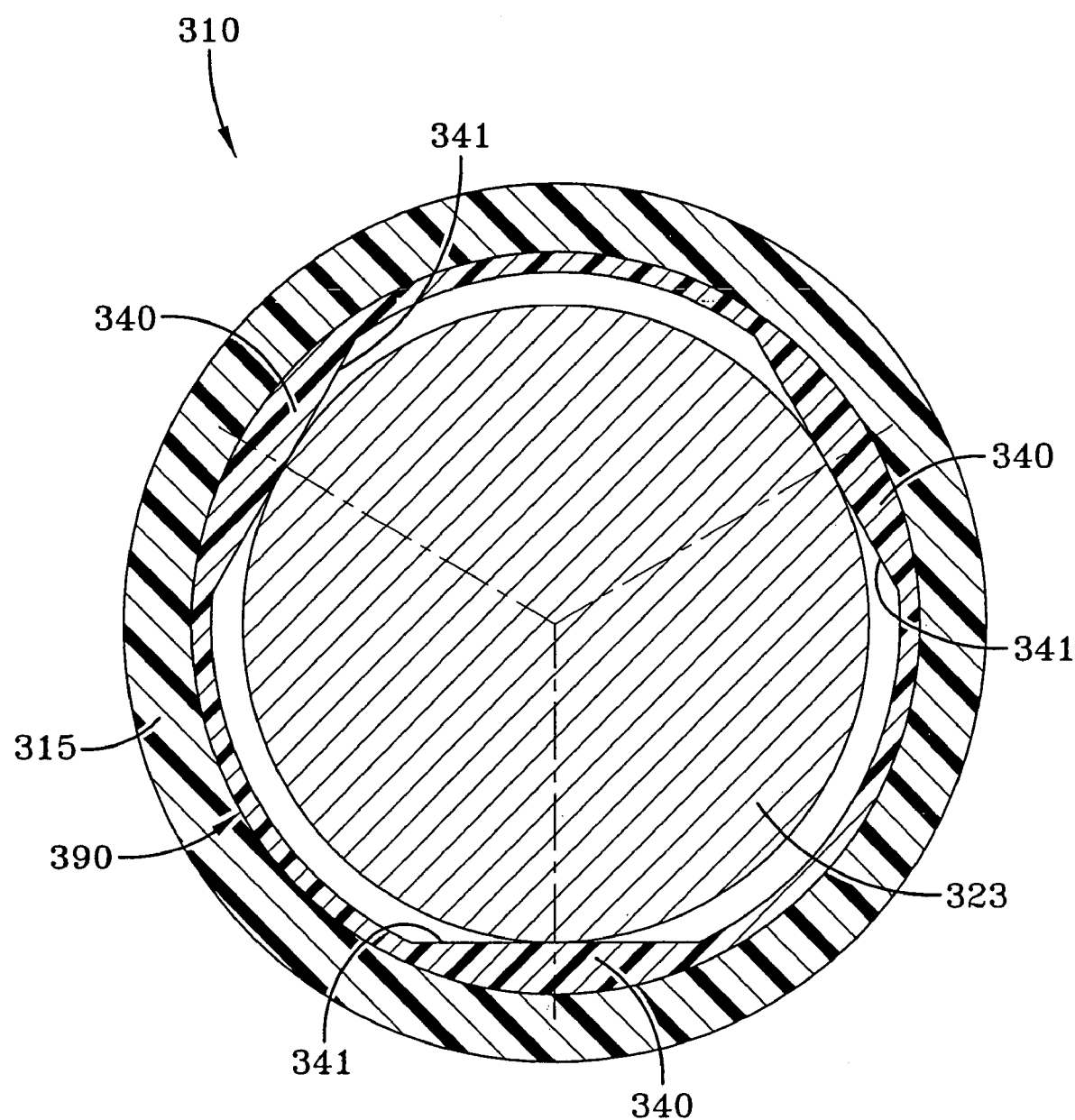
FIG. 4 is a cross sectional view of a second embodiment of a bearing unit in accordance with the present invention.

Referring now to FIG. 4, wherein a bearing unit 310 in accordance with an alternate embodiment of the present invention is generally similar to the bearing units illustrated hereinbefore in the previous figures and is thus indicated by reference numerals corresponding to those discussed above, except that a 300 "prefix" is utilized.

A rigid shell 315 has three staves or lands 340 provided around the radial inner portion thereof. Staves 340 are formed as a unitary or integral inner housing or lining 390, which is preferably made from the SPA elastomeric/plastic composite described hereinbefore. Housing 315 is preferably made from the shell materials also described hereinbefore. Lining 390 is preferably manufactured in the manner described in U.S. Pat. No. 4,735,982 referenced hereinabove, and installed in the shell 315 while it is still hot as part of the transfer molding process. Lining 390 is attached to the shell preferably utilizing an adhesion promoter and cross-linking agent, such as Vanchem HM-50 available from R.T. Vanderbilt Co. The prime advantage of this adhesive over others is its hot strength. Other attachment means, however, may be utilized to secure the lining into the shell.

The length-to-diameter ratio (L/D) of prior elastomer landed stave and full bearings is required by design specification to be on the order of four-to-one for received wear and life reasons. Bearing 310 permits much lower L/D, possibly on the order of two to one or even one to one, thereby reducing manufacturing costs. Also, lining 390 is relatively simple to manufacture and alleviates the need for machine finishing of the bore of housing 315. The bearing surface 341 of each land 340 can have either grooves or a pattern provided therein in accordance with the staves shown and described hereinbefore in FIGS. 2 and 3a-3c.

The invention has numerous advantages, some of which have been described above. It provides multiple contact, non-conforming water-lubricated polymer alloy bearing surfaces. By multiple-contact, this term refers to the multiple contact of the discontinuous surfaces of each bearing stave which contact the shaft. The bearing unit is non-confirming in that the various bearing staves absorb different amounts of radial pressure from the rotating shaft, as opposed to a customary conventional bearing with a bearing stave and cylindrical round bore absorbing all of the radial pressure in a single bearing surface. Some examples are discussed below, following a description of standard testing apparatus.

Figure 5:
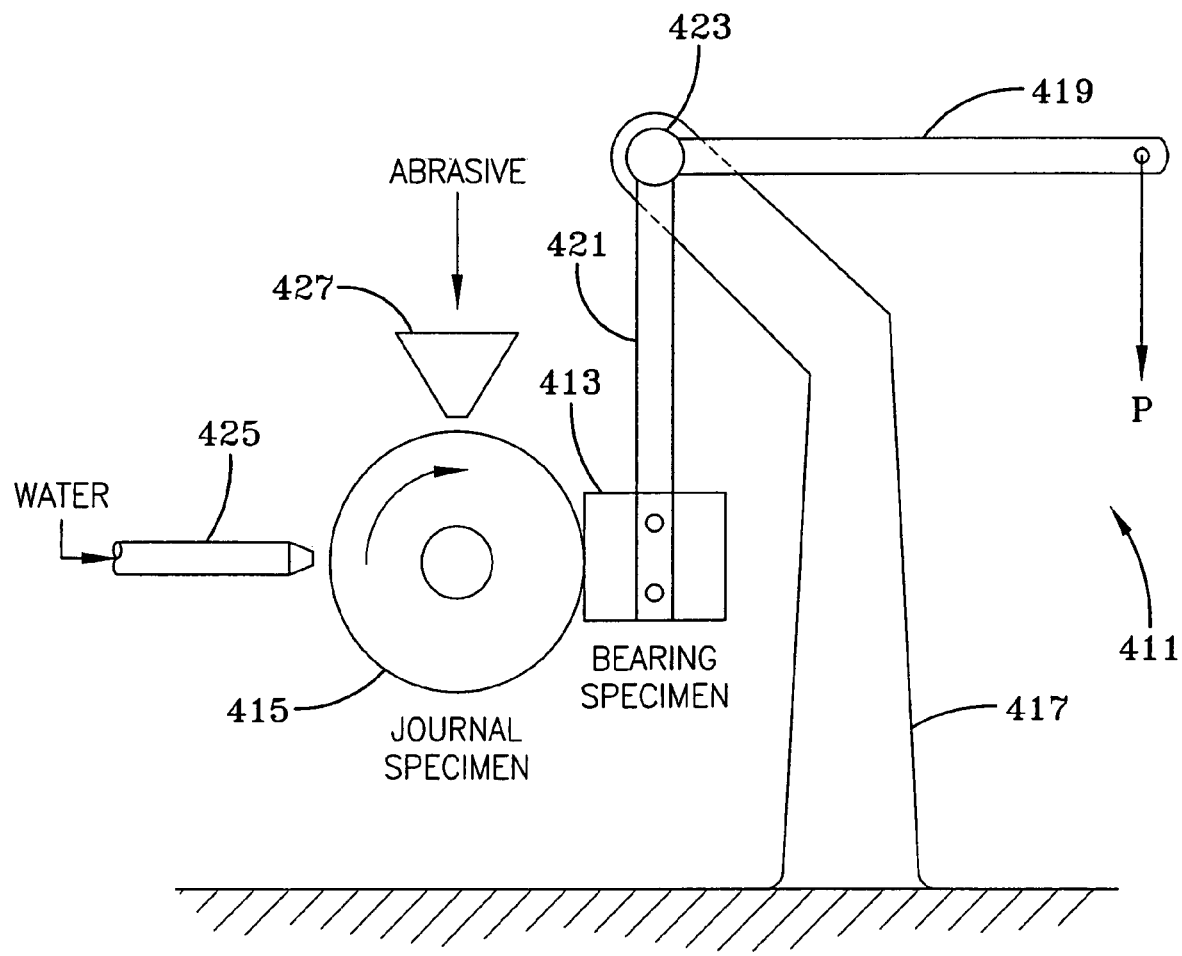
FIG. 5 is a schematic video of a Kommers system abrasive wear tester.

Bearing staves are often tested on the Kommers testing apparatus. Referring to FIG. 5, a Kommers system abrasive wear tester 411 is shown. Tester 411 tests a bearing specimen 413 against a rotating shaft 415. Tester 411 includes a support column 417 having a weighted handle 419 for rotating an arm 421 about an axle 423. Specimen 413 is attached to arm 421. Water is applied to shaft 415 by a water source 425, and a very abrasive grit is applied through abrasive source 427.

Referring to Table 1, the results of a test on the Kommers testing apparatus of bearing staves made from SPA having hardness of 63 Shore D and staves made from a presently available rubber Romor® material having a hardness of 85 Shore A (Shore D) are shown. (The Romor® stave bearing is composed of a nitrile rubber bearing surface on a UHMPE backing with a reduced breakaway coefficient of friction compared to other rubber bearings but still higher than most other non-rubber materials). The wear of the specimens was nearly the same, but there was no wear on the rotating shaft of the SPA bearing according to the invention described with reference to FIG. 2, where as there was 0.020 inches of wear in the Romor® bearing. The Romor® specimen-shaft system successfully passes the test requirements. The SPA system wear is even better.

TABLE 1

| Bearing Type | Specimen Wear (inch) | Shaft Wear 70 to 30 Cu—Ni (inch) |
| --- | --- | --- |
| SPA, 63 Shore D | 0.038 | 0 |
| Rubber, Romor ®, 85 Shore A | 0.033 | 0.020 |

Figure 6:
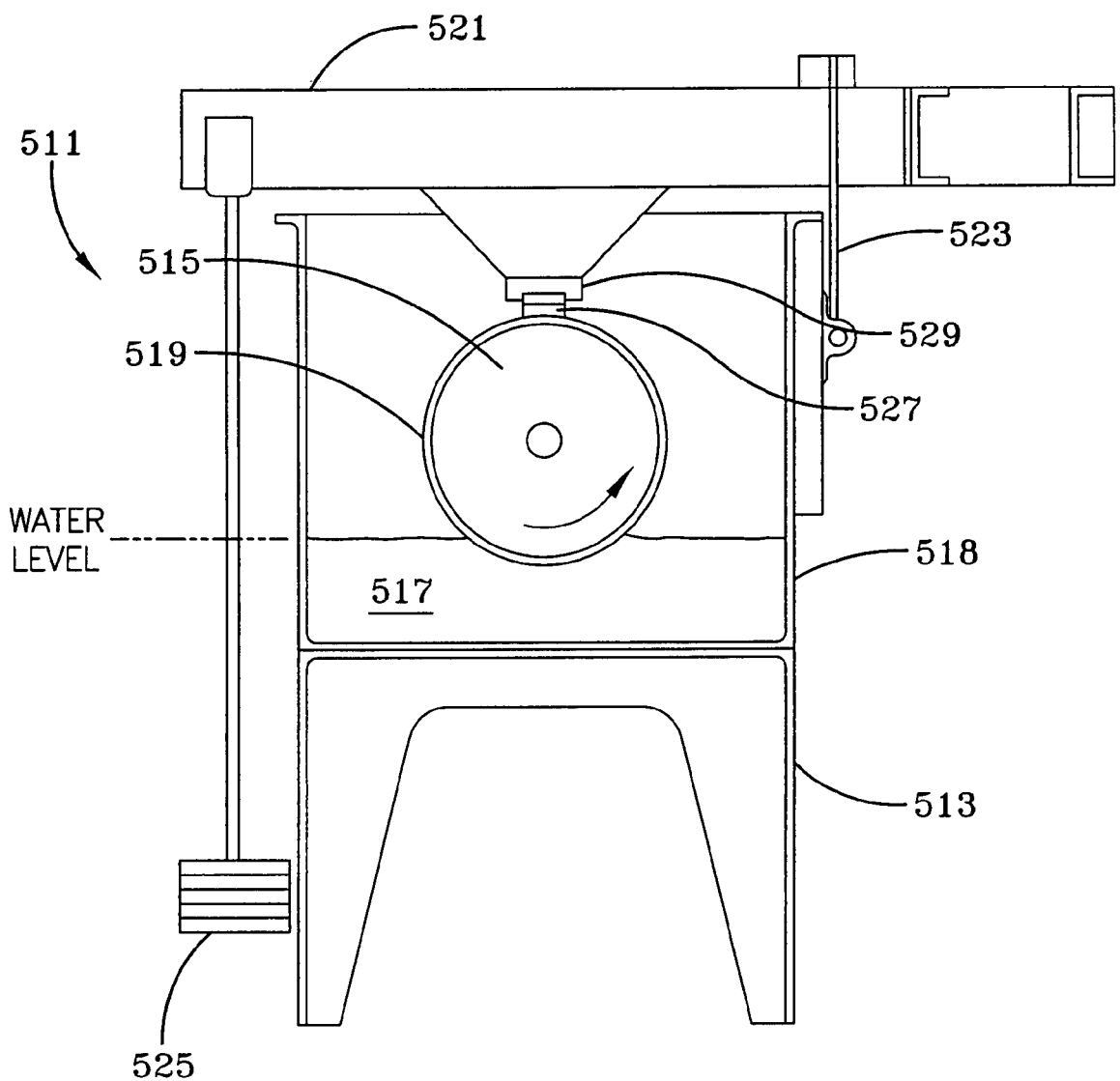
FIG. 6 is a schematic view of a bearing testing apparatus.

Another bearing testing apparatus 511 is shown in FIG. 6. It includes a table 513 having a rotating shaft 515 which is partially immersed in water 517 in a water tank 518. Rotating shaft 515 has a bronze sleeve or drum 519. A loading arm 521 is supported as a fulcrum by support member 523. Arm 521 is loaded by loading weights 525. A bearing piece or specimen 527 is held by a securing member 529.

It was noted earlier that the friction between the bearing element such as a stave according to the invention was found to decrease with increased load, rather than increasing as would been have expected from prior art bearings which lack the discontinuous surfaces. This is apparent from tests done on the testing apparatus shown in FIG. 6. These tests establish that the discontinuous surfaces of the SPA bearing material create lubricant pockets on the bearing element such as the bearing stave according to the invention. The lubricant is not the solid lubricant used to make SPA, but is rather the fluid in which the shaft is rotating, which for boats and ships is water. The tests showed that the decrease in friction is at least in part due to the creation of lubricant pockets on the bearing.

Figure 7:
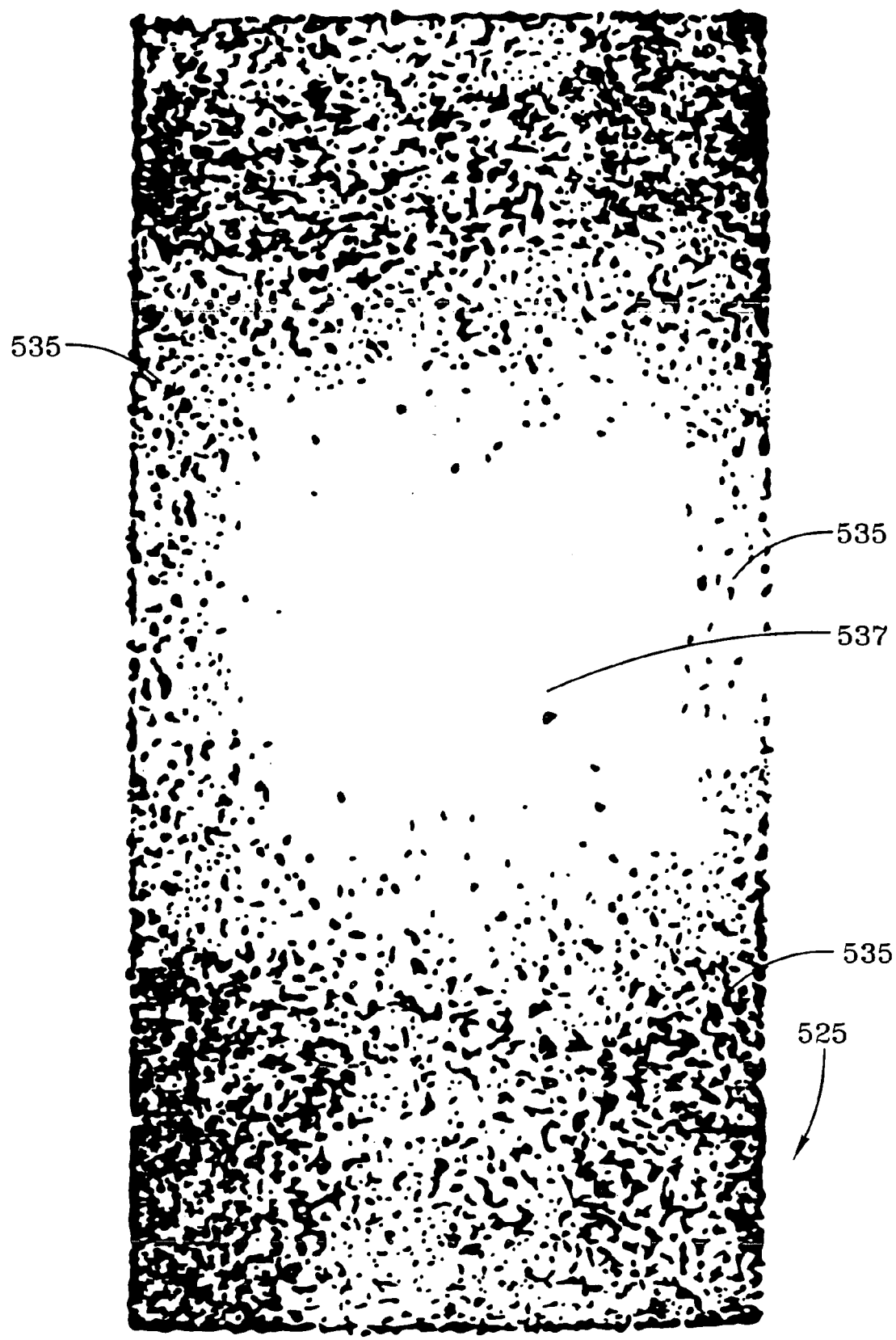
FIG. 7 is a view of a bearing patch which was tested on the apparatus shown in FIG. 6.

A specimen or patch corresponding to specimen 527 in FIG. 6 is shown in FIG. 7. FIG. 7 shows dark areas 535 where the bearing patch engaged shaft 515, and a light area 537 showing trapped water or the lubricant pocket, on which the rotating shaft "sits" and does not engage the bearing. It is this trapped water which reduces the friction of the rotating shaft.

The following Table 2 shows the specific wear of corresponding bearings made from SPA as compared with bearings made from rubber, namely Romor®.

TABLE 2

| | Specific wear = Volume loss/velocity × final pressure × test time | | |
| --- | --- | --- | --- |
| Bearing Type | Projected Pressure 210 PSI (1448 kpsi) | NPSI 420 PSI (2896 kpsi) | Specific Wear |
| SPA, 63 Shore D | 1.06 | 0.21 | $10^{-10}$ $in^5$ min/ft. lb. hr. |
| Rubber, Romor ® 85 Shore A | 1.00 | 5.58 | |

The foregoing specific wear test is based on dry weight loss (corrected to thickness loss using the final wear scar area, and the specific gravity,) actual (normal) load on the sample, shaft velocity and the total test time. The test results show the comparison after the projected pressure was doubled by reducing the axial length of the samples by 50 percent.

The reduction of the wear on the SPA bearing by 80 percent when the load was doubled was unexpected. What was expected was the more typical 458 percent increase in wear experienced in the rubber sample. The radial load was doubled by reducing the axial length of the sample because it was decided that it would be unsafe to double the weights on the load arms. The test demonstrated that SPA could be usefully deflected to form a pocket similar to that occurring with the rubber Romor® staves. The radial load in SPA required to cause this phenomena to occur was significantly higher for SPA because of its much higher modules of elasticity. It can be elastically distortedly 40 percent in compression.

The latter test shows that a large reduction in SPA wear can be realized if the contact pressure and the Shape Factor (defined for an elastomer as one load area divided by the total perimeter side area that is free to expand) are in the same range as those for the half-length of the SPA wear sample. As the present invention demonstrates, small L/D ratios can perform hydrodynamically. The SPA sample used in the FIG. 6 test had L/D equal to 0.1.

A full bearing tester is used to test full bearings which can be staved, molded or solid packed. In the test discussed below, the shaft diameter was 6.75 inches (171.5 mm) and the maximum axial length is 5.75 inches (146.1 mm). Higher projected pressures are possible by reducing the test bearing's axial length. Shaft speeds can be varied between 0 and 450 rpm. Transmitted drive torque is measured by a shaft-mounted differential dynamometer. The calibration process removes all extraneous sources of friction. Bearing load is applied by means of a compressed air cylinder acting on one end of a lever arm, the other end of which is attached to the bearing housing.

Figure 8:
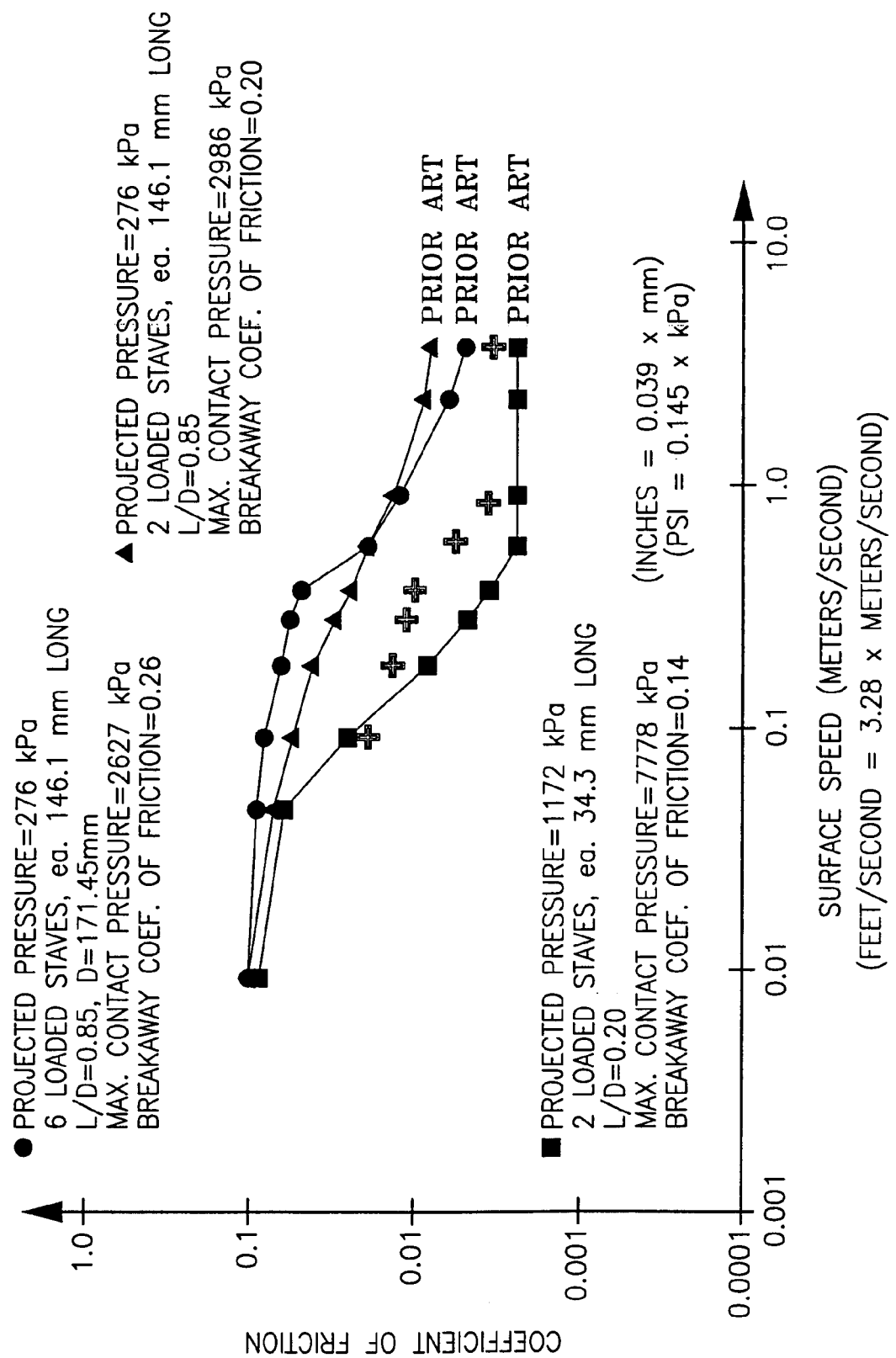
FIG. 8 is a graph from a full bearing tester coefficient of friction vs. shaft surface speed.

FIG. 8 compares the full bearing tester coefficient of friction vs. shaft surface speed results for a SPA bearing of the type shown in FIG. 2 with the standard ungrooved six loaded staves, a bearing with only two loaded SPA staves, and a two loaded stave SPA bearing in which the two staves are very short—L/D=0.2 compared with an L/D value of 0.85 for the other two bearings. Contact pressure was 1.128 psi (7778 kPa). The short staved sample clearly developed hydrodynamic lubrication at a much lower shaft speed after a 24-hour run-in. All bearings had a 24-hour run-in before testing.

Figure 9:
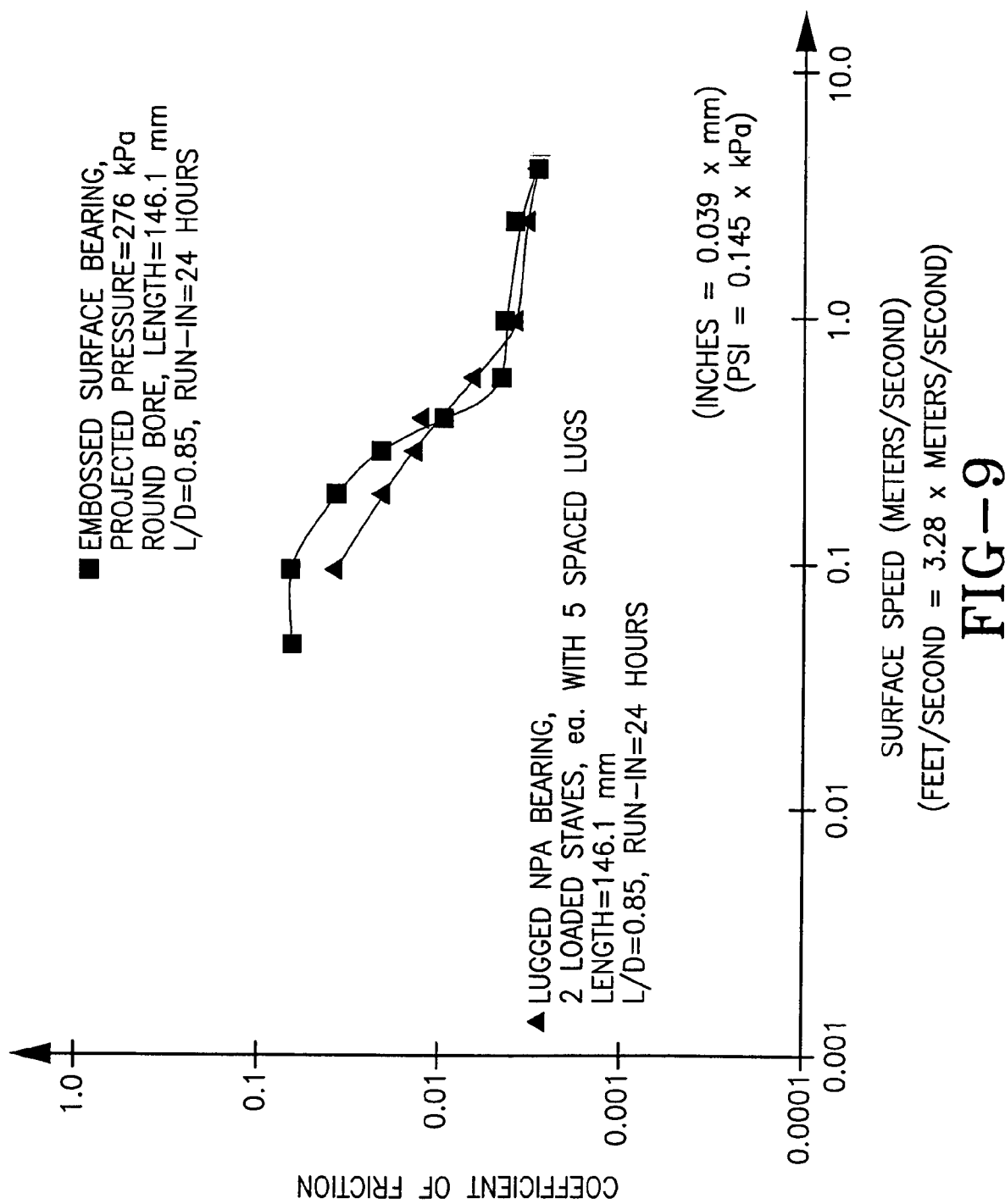
FIG. 9 is a graph of coefficient of friction values for a round bore embossed design and for a spaced lug bearing.

To verify that this was due to plasto-elastohydrodynamic action and not to a shortening of the bearing, two full-length staves were tested, each having five spaced lugs along the full length, similar to the bearing shown in FIG. 2, but with fewer grooves. Total lug face axial length for each stave was approximately equal to the length of each short stave. Each lug was 0.25 inch (6.35 mm) long in the axial direction and 0.25 inch (6.35 mm) deep. The test results are shown in FIG. 9. The crosses plotted on FIG. 8 are the rest results for this bearing. The values are approaching those for the short bearing after 24 hours run in even though the notch depth was 33 percent deeper than optimum, resulting in a smaller Shape Factor value which in turn reduced the contact pressure below the optimum range. FIG. 9 shows the coefficient of friction vs. shaft surface speed values for a lugged two-loaded stave bearing and an embossed surface full bearing. The curves are strikingly similar. It is obvious that when SPA is used any contact can be made to act hydrodynamically. Any coefficient of friction value below 0.01 is regarded as being well into the hydrodynamic range.

It will be apparent that, although a specific embodiment and a certain modification of the invention has been described in detail, the invention is not limited to the specifically illustrated and described constructions since variations may be made without departing from the principle of the invention.

I claim:

1. A bearing unit for holding a shaft, said bearing unit comprising:

a housing having a central opening for receiving a shaft, said housing having a length, an inner surface and a longitudinal axis;

at least one bearing land integral with said housing and forming a bearing layer, said inner surface being cylindrical in configuration except that said at least one bearing land extends inwardly from said cylindrical configuration for tangentially contacting and supporting a rotating shaft, said bearing layer being comprised of a slippery polymer alloy comprising a heterogeneous composition of a thermoplastic plastic in a continuous phase having a toughness of at least 20 foot-pound/inch based on an Izod unnotched impact test (ASTM 256), a breakaway coefficient of static friction at zero (0) rpm of no greater than 0.25, a wear resistance for passing the sand slurry abrasion test, a thermoset rubber compound dispersed in said thermoplastic as a discontinuous phase for adding flexibility to said bearing layer, and a lubricant dispersed in said thermoplastic.

2. A bearing unit according to claim 1 wherein said at least one bearing land consists of three lands.

3. A bearing unit according to claim 2 wherein said three bearing lands are spaced equiangularly from each other.

4. A bearing unit according to claim 2 wherein one of said bearing lands is located in line with the vertically downwardly extending radius of said bearing unit, the downwardly extending radius projecting through the midpoint of said one bearing land, and said remaining two bearing lands are above the horizontal diameter of said bearing unit and equiangularly spaced from the vertically upwardly extending radius of said bearing unit.

5. A bearing unit according to claim 1 wherein said at least one bearing land is more than one bearing land disposed equiangularly from each other.

6. A bearing unit according to claim 1 wherein said at least one bearing land has a land inner surface for engaging a shaft, said land inner surface being discontinuous.

7. A bearing unit according to claim 1 wherein said at least one bearing land has a land inner surface, said land inner surface having grooves.

8. A bearing unit according to claim 1 wherein said at least one bearing land has a land inner surface having a pattern of protrusions extending towards the axial centerline of said bearing unit.

9. A bearing unit according to claim 8 wherein said protrusions are diamond shaped.

10. A bearing unit according to claim 1 wherein said at least one bearing land has a land inner surface, said land inner surface having contact points, said contact points becoming hydrodynamic bearing surfaces when fluid lubricated.

* * * * *